US012384095B2

(12) United States Patent
Zu et al.

(10) Patent No.: US 12,384,095 B2
(45) Date of Patent: Aug. 12, 2025

(54) TRANSITION METHOD AND SYSTEM FROM HELICAL WINDING TO HOOP WINDING OF COMPOSITE FIBERS

(71) Applicant: Hefei University of Technology, Hefei (CN)

(72) Inventors: Lei Zu, Hefei (CN); Shijun Chen, Hefei (CN); Qian Zhang, Hefei (CN); Guiming Zhang, Hefei (CN); Qiaoguo Wu, Hefei (CN); Xiang Xue, Hefei (CN); Debao Li, Hefei (CN); Huabi Wang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 507 days.

(21) Appl. No.: 17/810,786

(22) Filed: Jul. 5, 2022

(65) Prior Publication Data

US 2023/0017601 A1 Jan. 19, 2023

(30) Foreign Application Priority Data

Jul. 13, 2021 (CN) .......................... 202110788959.6

(51) Int. Cl.
*B29C 53/80* (2006.01)
*B29C 53/60* (2006.01)
(52) U.S. Cl.
CPC ........ *B29C 53/8041* (2013.01); *B29C 53/602* (2013.01); *B65H 2515/30* (2013.01); *B65H 2601/51* (2013.01)

(58) Field of Classification Search
CPC ... B29C 53/602; B29C 53/56; B29C 53/8041; B29C 70/16; B65H 54/02; B65H 54/04;
(Continued)

(56) References Cited

U.S. PATENT DOCUMENTS 4,943,334 A * 7/1990 Medney ................. B29C 53/76
156/169
4,952,312 A * 8/1990 Zantonelli ............ B29C 53/665
210/321.74

(Continued)

FOREIGN PATENT DOCUMENTS

CN 86103358 A * 12/1986 ........... B01D 63/021
CN 108621450 A * 10/2018 ........... B29C 53/605
(Continued)

*Primary Examiner* — Anna M Momper
*Assistant Examiner* — Henrix Soto
(74) *Attorney, Agent, or Firm* — McClure, Qualey & Rodack, LLP (57) ABSTRACT

The present disclosure relates to a transition method and system from helical winding to hoop winding of composite fibers. The method includes: setting a slip coefficient, and performing iterative calculation forward from an iteration starting point according to an equation set of a winding angle and a center angle of rotation to obtain a winding angle at an iteration termination point; and if the winding angle at the iteration termination point is greater than a first preset angle, adjusting the slip coefficient corresponding to a cylinder body according to the first preset angle, extending a length of a helical winding transition section to a front equator, and starting the hoop winding at the front equator at the first preset angle to complete planning of the helical winding transition section.

9 Claims, 2 Drawing Sheets (58) Field of Classification Search
CPC ........ B65H 54/06; B65H 54/08; B65H 54/10;
B65H 54/22; B65H 55/04; B65H
2701/31; H01F 41/00; H01F 41/02; H01F
41/06; H01F 41/064; H01F 41/094; H01F
41/098; H02K 15/00; H02K 15/0435;
H02K 15/08
USPC ...................................................... 242/447.1
See application file for complete search history.

(56) References Cited

U.S. PATENT DOCUMENTS

| | | | | |
|---|---|---|---|---|
| 2014/0199504 A1* | 7/2014 | Anderson | ............... | B29C 53/64 156/169 |
| 2015/0034233 A1* | 2/2015 | Hatta | ........................ | F17C 1/06 156/172 |
| 2015/0153002 A1* | 6/2015 | Tanabe | .................. | B29C 53/602 156/64 |
| 2019/0168989 A1* | 6/2019 | Kobayashi | ............. | B65H 54/44 |
| 2020/0224823 A1* | 7/2020 | Hatta | ....................... | B29C 63/08 |
| 2020/0309307 A1* | 10/2020 | Syed | ........................ | B32B 7/08 |

FOREIGN PATENT DOCUMENTS

| | | | | |
|---|---|---|---|---|
| DE | 19654118 A1 * | 6/1998 | ........... | B29C 53/607 |
| EP | 2949449 A1 * | 12/2015 | ........... | B29C 53/602 |
| JP | 2001263590 A * | 9/2001 | | |
| KR | 20090017411 A * | 2/2009 | | |
| KR | 102127894 B1 * | 6/2020 | | |
| WO | WO-2020045161 A1 * | 3/2020 | ............. | B65H 55/00 |

* cited by examiner

FIG. 1

| Set a slip coefficient, and take a termination point of the helical winding as an iteration starting point of a helical winding transition section |
|---|

↓ S1

| Perform iterative calculation forward from the iteration starting point according to an equation set of a winding angle and a center angle of rotation to obtain a winding angle at an iteration termination point |
|---|

↓ S2

| Determine whether the winding angle at the iteration termination point is greater than a first preset angle to obtain a first determination result |
|---|

↓ S3

| If the first determination result is yes, adjust the slip coefficient corresponding to the cylinder body according to the first preset angle, extend a length of the helical winding transition section to a front equator, and start the hoop winding at the front equator at the first preset angle to complete planning of the helical winding transition section |
|---|

↓ S4

| If the first determination result is no, determine whether a number of times of determination of the first determination result of no reaches a preset number of times; if yes, set the number of times of determination to 0, and return to the step of "setting a slip coefficient"; and if not, search for a return point on a front head, take the return point as the iteration starting point, and return to the step of "performing iterative calculation forward from the iteration starting point according to an equation set of a winding angle and a center angle of rotation" |
|---|

TRANSITION METHOD AND SYSTEM FROM HELICAL WINDING TO HOOP WINDING OF COMPOSITE FIBERS

CROSS REFERENCE TO RELATED APPLICATION

This patent application claims the benefit and priority of Chinese Patent Application No. 202110788959.6, filed on Jul. 13, 2021, the disclosure of which is incorporated by reference herein in its entirety as part of the present application.

TECHNICAL FIELD

The present disclosure relates to the technical field of composite fiber winding, and in particular, to a transition method and system from helical winding to hoop winding of composite fibers.

BACKGROUND ART

With continuous progress of control technology, winding machines are developed from original mechanically-controlled winding machines to digital control winding machines, and to the current microcomputer-controlled winding machine. It is imperative to make the winding process intelligent and unmanned. However, due to the particularity, the winding process cannot be fully intelligent at present, since a wound product usually has various laying forms, basically including helical winding and hoop winding. However, since the yarn stays at a polar hole of a head at the end of the helical winding, and the starting point of the hoop winding is at the equator of a cylinder body, the hoop winding cannot be performed directly after the helical winding. In order to avoid scattering of wound fibers caused by movement of the winding machine, the fibers are cut after the helical winding, and the hoop winding is performed. Therefore, the winding efficiency is greatly limited, and the labor cost is increased.

SUMMARY

An objective of the present disclosure is to provide a transition method and system from helical winding to hoop winding of composite fibers, so as to automatically transition from the helical winding to the hoop winding, reduce manpower input, and improve winding efficiency.

In order to achieve the above objective, the present disclosure provides the following technical solutions:

A transition method from helical winding to hoop winding of composite fibers includes the following steps:

setting a slip coefficient, and taking a termination point of the helical winding as an iteration starting point of a helical winding transition section;

performing iterative calculation forward from the iteration starting point according to an equation set of a winding angle and a center angle of rotation to obtain a winding angle at an iteration termination point, where a direction from the iteration starting point to a cylinder body is defined as a front direction; and determining whether the winding angle at the iteration termination point is greater than a first preset angle to obtain a first determination result;

if the first determination result is yes, adjusting the slip coefficient corresponding to the cylinder body according to the first preset angle, extending a length of the helical winding transition section to a front equator, and starting the hoop winding at the front equator at the first preset angle to complete planning of the helical winding transition section; and if the first determination result is no, determining whether a number of times of determination of the first determination result of no reaches a preset number of times; if yes, setting the number of times of determination to 0, and returning to the step of "setting a slip coefficient"; and if not, searching for a return point on a front head, taking the return point as the iteration starting point, and returning to the step of "performing iterative calculation forward from the iteration starting point according to an equation set of a winding angle and a center angle of rotation".

A transition system from helical winding to hoop winding of composite fibers includes:

a setting module configured to set a slip coefficient, and take a termination point of the helical winding as an iteration starting point of a helical winding transition section;

an iterative calculation module configured to perform iterative calculation forward from the iteration starting point according to an equation set of a winding angle and a center angle of rotation to obtain a winding angle at an iteration termination point, where a direction from the iteration starting point to a cylinder body is defined as a front direction; and a determination module configured to determine whether the winding angle at the iteration termination point is greater than a first preset angle to obtain a first determination result;

a planning module configured to adjust the slip coefficient corresponding to the cylinder body according to the first preset angle, extend a length of the helical winding transition section to a front equator, and start the hoop winding at the front equator at the first preset angle to complete planning of the helical winding transition section if the first determination result is yes; and a returning module configured to determine whether a number of times of determination of the first determination result of no reaches a preset number of times if the first determination result is no, set the number of times of determination to 0 and return to the step of "setting a slip coefficient" if yes, and search for a return point on a front head, take the return point as the iteration starting point, and return to the step of "performing iterative calculation forward from the iteration starting point according to an equation set of a winding angle and a center angle of rotation" if not.

According to the specific embodiments provided by the present disclosure, the present disclosure discloses the following technical effects:

According to the transition method and system from helical winding to hoop winding of composite fibers provided by the present disclosure, the method includes: setting a slip coefficient, and performing iterative calculation forward from an iteration starting point according to an equation set of a winding angle and a center angle of rotation to obtain a winding angle at an iteration termination point; and if the winding angle at the iteration termination point is greater than a first preset angle, adjusting the slip coefficient corresponding to a cylinder body according to the first preset angle, extending a length of a helical winding transition section to a front equator, and starting the hoop winding at the front equator at the first preset angle to complete planning of the helical winding transition section. In this way, the helical winding is automatically transitioned to the hoop winding, manpower input is reduced, winding efficiency is improved, a whole winding process is continuously performed, and overall mechanical properties of a wound product can be improved.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

REFERENCE NUMERALS

1—left polar hole; 2—left head; 3—left equator; 4—cylinder body; 5—right equator; 6—right head; 7—right polar hole; and 8—composite fiber.

DETAILED DESCRIPTION OF THE EMBODIMENTS

The technical solutions in the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a transition method and system from helical winding to hoop winding of composite fibers, so as to automatically transition from the helical winding to the hoop winding, reduce manpower input, and improve winding efficiency.

To make the above-mentioned objective, features, and advantages of the present disclosure clearer and more comprehensible, the present disclosure will be further described in detail below in conjunction with the accompanying drawings and specific embodiments.

Embodiment 1

Figure 1:
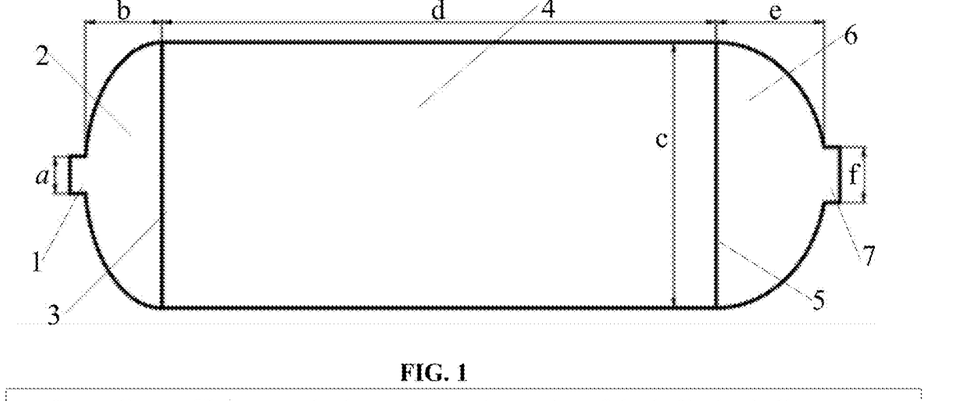
FIG. 1 is a schematic structural diagram of a mandrel provided by Embodiment 1 of the present disclosure.
Figure 2:
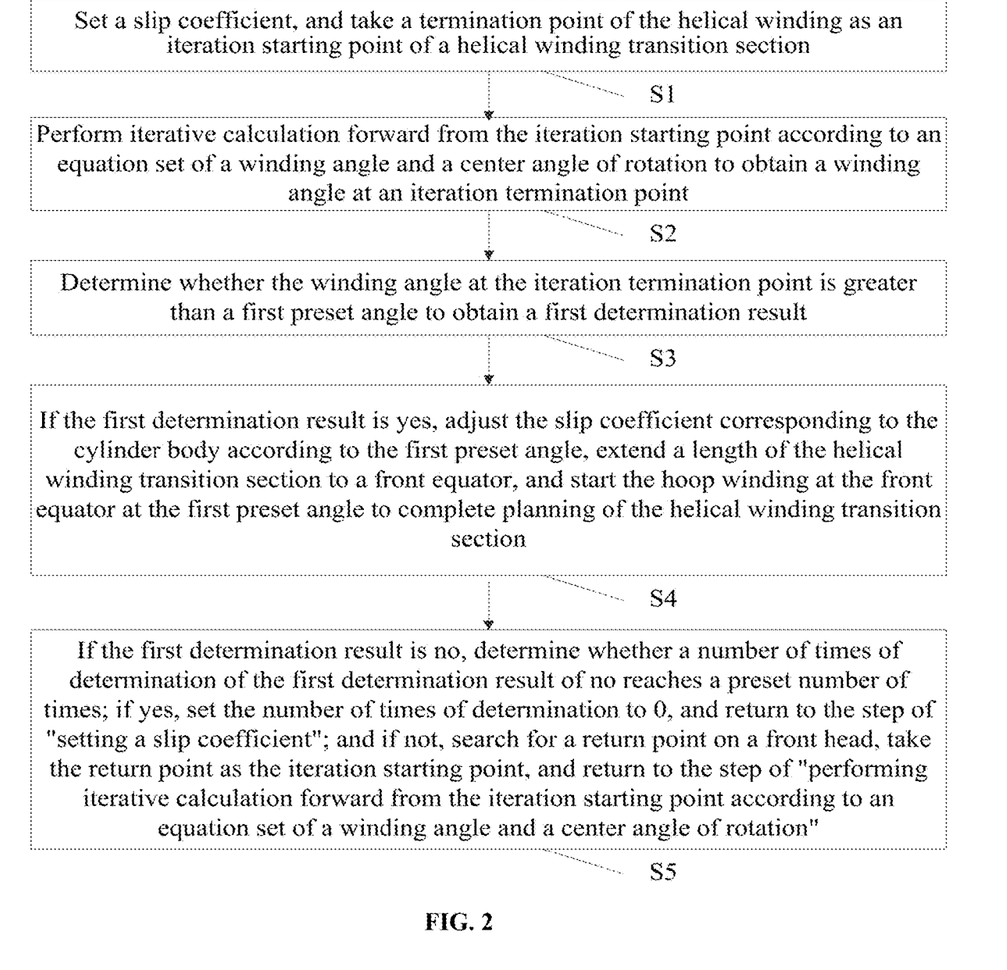
FIG. 2 is a flow chart of a transition method provided by Embodiment 1 of the present disclosure.

The present embodiment is to provide a transition method from helical winding to hoop winding of composite fibers. Before introducing the transition method, an application scenario of the present embodiment is introduced. The composite fibers need to be wound on a mandrel shown in FIG. 1. The mandrel includes a left polar hole 1, a left head 2, a left equator 3, a cylinder body 4, a right equator 5, a right head 6, and a right polar hole 7. The left polar hole 1 is located on the left head 2. The left equator 3 and the right equator 5 are both located on the cylinder body 4. The right polar hole 7 is located on the right head 6. The size parameters of the mandrel to be wound are given in advance. As shown in FIG. 1, the size parameters include a diameter a of the left polar hole, a length b of the left head, a diameter c of the cylinder body, a length d of the cylinder body, a length e of the right head, and a diameter f of the right polar hole. Since the yarn stays at the polar hole of the head at the end of the helical winding, which may be the left polar hole 1 or the right polar hole 7, and the starting point of the hoop winding is at the equator of the cylinder body, which may be the left equator 3 or the right equator 5, in order to transition from the helical winding to the hoop winding, in the existing methods, the fibers are cut after the helical winding, and the hoop winding is performed, which greatly limits the winding efficiency and increases the labor cost. In order to solve this problem, the present embodiment is to provide a transition method to automatically transition from the helical winding to the hoop winding. As shown in FIG. 2, the transition method includes the following steps.

S1: A slip coefficient is set, and a termination point of the helical winding is taken as an iteration starting point of a helical winding transition section.

If the termination point of the helical winding is the left polar hole 1, the left polar hole 1 is taken as the iteration starting point of the helical winding transition section. If the termination point of the helical winding is the right polar hole 7, the right polar hole 7 is taken as the iteration starting point of the helical winding transition section. Since the starting point of the hoop winding is located at the equator of the cylinder body, the transition from the helical winding to the hoop winding is realized on the cylinder body 4, while the head is only used for angle transformation and steering. Therefore, in the present embodiment, when the size parameters of the mandrel are given in advance, if the termination point of the helical winding is the left polar hole 1, the diameter of the right polar hole 7 may not be given, and if the termination point of the helical winding is the right polar hole 7, the diameter of the left polar hole 1 may not be given, because the other head does not need to be evenly distributed and cut to the polar hole, and the head is only used to change the winding direction of the fibers.

S2: Iterative calculation is performed forward from the iteration starting point according to an equation set of a winding angle and a center angle of rotation to obtain a winding angle at an iteration termination point. A direction from the iteration starting point to a cylinder body is defined as a front direction.

It should be noted that with reference to FIG. 1, when the iteration starting point is located on the left head 2, when facing FIG. 1, the right side is the front, and when the iteration starting point is located on the right head 6, when facing FIG. 1, the left side is the front.

The equation set of a winding angle and a center angle of rotation used in the present embodiment is as follows:

$$\begin{cases} \dfrac{d\alpha}{dz} = \dfrac{\lambda\left[(1+r'^2)\sin^2\alpha - rr''\cos^2\alpha\right] - (1+r'^2)r'\sin\alpha}{r\cos\alpha(1+r'^2)} \\ \dfrac{d\theta}{dz} = \dfrac{r\tan\alpha}{\sqrt{1+(r')^2}} \end{cases} \quad (1)$$

In Formula 1, $\alpha$ is the winding angle. z is an axial coordinate of a mandrel, and a horizontal direction shown in FIG. 1 is an axial direction. $\lambda$ is a slip coefficient between the fibers and the mandrel. r is a radius of the mandrel in a radial direction corresponding to the axial coordinate, which can also be called a radius of a parallel circle corresponding to the axial coordinate, and a vertical direction shown in FIG. 1 is the radial direction. r' is a first derivative of the radius of the mandrel to the axial coordinate. r" is a second derivative of the radius of the mandrel to the axial coordinate. θ is the center angle of rotation.

Specifically, S2 may include the following steps.

1) A winding angle and a center angle of rotation at the iteration starting point are set, and the winding angle and the center angle of rotation at the iteration starting point are taken as a previous winding angle and a previous center angle of rotation. Specifically, the winding angle at the iteration starting point may be set to 89.9°, and the center angle of rotation at the iteration starting point may be set to 0°.
2) A current axial coordinate is calculated according to a preset stride in each iteration.
3) The current axial coordinate, the previous winding angle, and the previous center angle of rotation are taken as inputs, and a current winding angle and a current center angle of rotation are calculated according to the equation set of a winding angle and a center angle of rotation.
4) Whether iteration termination conditions are reached is determined. If yes, the iteration is ended to obtain the winding angle at the iteration termination point. If not, the iteration is continued, the current winding angle is taken as a previous winding angle in a next iteration, the current center angle of rotation is taken as a previous center angle of rotation in the next iteration, and the method returns to the step of "calculating a current axial coordinate according to a preset stride in each iteration".

Furthermore, the present embodiment specifically selects that the iteration termination point is on the cylinder body 4 and the winding angle cannot exceed 89.9° as constraints, and 4) may include the following steps.

Whether the current axial coordinate is less than an axial coordinate at the front equator is determined to obtain a second determination result. The front equator refers to the corresponding equator when the fiber winding direction is taken as the forward direction. The axial coordinate is a coordinate obtained by taking the iteration starting point as a coordinate origin and the front direction as a positive axial direction.

If the second determination result is no, the iteration is ended, a position of an axial coordinate of a previous iteration is taken as the iteration termination point, and a winding angle of the previous iteration is taken as the winding angle at the iteration termination point.

If the second determination result is yes, whether the current winding angle reaches a second preset angle is determined to obtain a third determination result. The second preset angle may be 89.9°.

If the third determination result is yes, the iteration is ended, a position of the current axial coordinate is taken as the iteration termination point, and the current winding angle is taken as the winding angle at the iteration termination point.

If the third determination result is no, the iteration is continued.

S3: Whether the winding angle at the iteration termination point is greater than a first preset angle is determined to obtain a first determination result.

The first preset angle is greater than or equal to 85° and less than or equal to 89.9°, such that the hoop winding can be started.

S4: If the first determination result is yes, the slip coefficient corresponding to the cylinder body is adjusted according to the first preset angle, a length of the helical winding transition section is extended to a front equator, and the hoop winding is started at the front equator at the first preset angle to complete planning of the helical winding transition section.

The step of adjusting the slip coefficient corresponding to the cylinder body 4 according to the first preset angle may include the following steps: a winding angle at a rear equator during the iterative calculation is taken as a first winding angle, and the slip coefficient corresponding to the cylinder body 4 is adjusted by a slip coefficient calculation formula according to the first winding angle and the first preset angle.

Further, the slip coefficient calculation formula is as follows:

$$\lambda_1 = \frac{R}{L}\left(\frac{1}{\sin\alpha_0} - \frac{1}{\sin\alpha_1}\right). \tag{2}$$

In Formula 2, L is a length of the cylinder body. R is a radius of the cylinder body. $\lambda_1$ is the slip coefficient corresponding to the cylinder body. $\alpha_0$ is the first winding angle. $\alpha_1$ is the first preset angle.

If the first determination result is yes, the hoop winding can be started on the cylinder body 4 in this cycle. However, since the winding angle at the front equator is not necessarily the first preset angle during slipping according to the preset slip coefficient, the slip coefficient of the cylinder body is adjusted by Formula 2, such that the wire nozzle can be transitioned from the termination point of the helical winding to the starting point of the hoop winding. In addition, the winding angle of the fibers can reach the first preset angle at the starting point of the hoop winding after the transition transformation, and the hoop winding can be started, so as to automatically transition from the helical winding to the hoop winding.

S5: If the first determination result is no, whether a number of times of determination of the first determination result of no reaches a preset number of times is determined. If yes, the number of times of determination is set to 0, and the method returns to the step of "setting a slip coefficient". If not, a return point on a front head is searched for, the return point is taken as the iteration starting point, and the method returns to the step of "performing iterative calculation forward from the iteration starting point according to an equation set of a winding angle and a center angle of rotation".

If the first determination result is no, the hoop winding cannot be started on the cylinder body 4 in this cycle. It is necessary to re-determine the iteration starting point after the front head is commutated, and the cycle is repeated. Considering the planning efficiency, the commutation cannot be performed multiple times, so the present embodiment sets a preset number of times. After the number of times of determination of the first determination result of no reaches the preset number of times, that is, after the number of times to be commutated reaches the preset number of times, it is considered that the set slip coefficient is inappropriate. Under this slip coefficient, the hoop winding cannot be started on the cylinder body 4, so the slip coefficient needs to be adjusted, and the slip coefficient is less than the maximum static friction coefficient.

The step of searching for a return point on a front head may include the following steps: the front equator is taken as the starting point, the iterative calculation is performed forward from the starting point according to the equation set of a winding angle and a center angle of rotation, and the iterative termination point is determined. The termination point is taken as the return point on the front head.

Further, a winding angle and a center angle of rotation at the starting point are taken as an initial winding angle and an initial center angle of rotation.

An axial coordinate after the iteration is calculated according to a preset stride in each iteration.

The axial coordinate after the iteration, the initial winding angle, and the initial center angle of rotation are taken as inputs, and a winding angle after the iteration and a center angle of rotation after the iteration are calculated according to the equation set of a winding angle and a center angle of rotation (namely, Formula 1).

Whether the winding angle after the iteration reaches a third preset angle is determined. The third preset angle may be 89.9°.

If yes, the iteration is ended, and a position of the axial coordinate after the iteration is taken as the iteration termination point.

If not, the iteration is continued, the winding angle after the iteration is taken as an initial winding angle in a next iteration, the center angle of rotation after the iteration is taken as an initial center angle of rotation in the next iteration, and the method returns to the step of "calculating an axial coordinate after the iteration according to a preset stride in each iteration".

Specifically, the preset number of times may be 3. In order to further illustrate the transition method of the present embodiment, the transition method is further described here by taking the preset number of times as 3, the termination point of the helical winding as the left polar hole 1, the first preset angle as 85°, and the second preset angle and the third preset angle as 89.9° as an example.

There are four cases for the solver process of the helical winding transition section of the entire transition method.

Case I: Starting from the left head 2, the helical winding can be transitioned to the hoop winding through the left head 2 and the cylinder body 4.

Case II: Starting from the left head 2, the helical winding cannot be transitioned to the hoop winding through the left head 2 and the cylinder body 4. Solving is continued, the cylinder body 4 is turned back to through the right head 6, and the helical winding is transitioned to the hoop winding at the cylinder body 4 at this time.

Case III: Starting from the left head 2, the helical winding cannot be transitioned to the hoop winding through the left head 2 and the cylinder body 4. The cylinder body 4 is turned back to through the right head 6, and the helical winding still cannot be transitioned to the hoop winding at the cylinder body 4. Solving is continued, the cylinder body 4 is turned back to through the left head 2 again, and the helical winding is transitioned to the hoop winding at the cylinder body 4 at this time.

Case IV: If the above three cases are not tenable, that is, the helical winding cannot be transitioned to the hoop winding under the given slip coefficient, so the slip coefficient needs to be changed, and the planning and calculation shall be performed again.

1) Case I

The solution process starts from the left polar hole 1 of the left head 2. For the initial conditions, the slip coefficient $\lambda$ is given, the initial winding angle is as follows: $\alpha=89.9°$ (the tangent value of 90° cannot be calculated), and the initial center angle of rotation is as follows: $\theta=0°$. By substituting the initial conditions into Formula 1, the change value of the winding angle at the left head 2 with the axial coordinate can be obtained. In order to ensure the complete transition of the whole calculation, the last point of the left head 2 is taken as the first point of the cylinder body 4, and the first point of the cylinder body 4 is at the left equator 3. Therefore, $\alpha$ and $\theta$ corresponding to the left equator 3 are substituted into Formula 1 to continue solving to obtain the winding angle of the cylinder body section at the iteration termination point. A first determination is made on the winding angle of the cylinder body section: if the winding angle of the cylinder body section is greater than 85°, it is considered that the helical winding can be transitioned to the hoop winding when the cylinder body 4 is reached for the first time. However, since the end point of the helical winding to the hoop winding may not be exactly located at the right equator 5 at this time, in order to make the end point of the helical winding to the hoop winding be located at the right equator 5 (because the starting point of the hoop winding is at the equator), the slip coefficient 2 needs to be adjusted to extend the length of the transition section to the right equator 5. Therefore, according to Formula 2, the initial winding angle of the left equator 3 $\alpha_0$, the winding angle of the right equator 5 $\alpha_1=85°$, the length L of the cylinder body, and the radius R of the cylinder body are substituted to re-calculate the actual slip coefficient of the cylinder body section. The obtained actual slip coefficient of the cylinder body section is substituted into the winding angle solution formula of Formula 1 to re-solve the winding angle on the cylinder body 4, such that the winding angle of the fibers at the right equator 5 can reach just 85°, that is, the end point of the helical winding to the hoop winding is exactly at the right equator 5, and the hoop winding starts at 85° at the right equator 5. That is, the termination point of the helical winding can be transitioned to the starting point of the hoop winding, and at the starting point of the hoop winding, the winding angle of the fibers is 85°, so as to automatically transition from the helical winding to the hoop winding.

2) Case II

The solution process starts from the left polar hole 1 of the left head 2. For the initial conditions, the slip coefficient 2 is given, the initial winding angle is as follows: $\alpha=89.9°$ (the tangent value of 90° cannot be calculated), and the initial center angle of rotation is as follows: $\theta=0°$. By substituting the initial conditions into Formula 1, the change value of the winding angle at the left head 2 with the axial coordinate can be obtained. In order to ensure the complete transition of the whole calculation, the last point of the left head 2 is taken as the first point of the cylinder body 4, and the first point of the cylinder body 4 is at the left equator 3. Therefore, a and $\theta$ corresponding to the left equator 3 are substituted into Formula 1 to continue solving to obtain the winding angle of the cylinder body section at the iteration termination point. A first determination is made on the winding angle of the cylinder body section: if the winding angle of the cylinder body section is less than 85°, it is considered that the helical winding cannot be transitioned to the hoop winding when the cylinder body 4 is reached for the first time. At this time, the winding angle of the right head is calculated. The last point of the cylinder body 4 is taken as the first point of the right head 6, and the last point of the cylinder body 4 is at the right equator 5. Therefore, α and θ corresponding to the right equator 5 are substituted into Formula 1 to continue to solve the winding angle of the right head section until the winding angle of the right head section reaches 89.9°, the position at this time is taken as the return point, and the return point is taken as the iteration starting point. The initial conditions set above are re-substituted into Formula 1 for solution to calculate the winding angle of the cylinder body section at the iteration termination point returned from the right head 6. At this time, a second determination is made on the winding angle of the cylinder body section. If the winding angle of the cylinder body section is greater than 85°, the helical winding can be transitioned to the hoop winding when the cylinder body 4 is reached for the second time. However, since the end point of the helical winding to the hoop winding may not be exactly located at the left equator 3 at this time, in order to make the end point of the helical winding to the hoop winding be located at the left equator 3 (because the starting point of the hoop winding is at the equator), the slip coefficient λ needs to be adjusted to extend the length of the transition section to the left equator 3. Therefore, according to Formula 2, the initial winding angle of the right equator 5 $α_0$, the winding angle of the left equator 3 $α_1$=85°, the length L of the cylinder body, and the radius R of the cylinder body are substituted to re-calculate the actual slip coefficient of the cylinder body section. The obtained actual slip coefficient of the cylinder body section is substituted into the winding angle solution formula of Formula 1 to re-solve the winding angle on the cylinder body 4, such that the winding angle of the fibers at the left equator 3 can reach just 85°, that is, the end point of the helical winding to the hoop winding is exactly at the left equator 3, and the hoop winding starts at 85° at the left equator 3. That is, the termination point of the helical winding can be transitioned to the starting point of the hoop winding, and at the starting point of the hoop winding, the winding angle of the fibers is 85°, so as to automatically transition from the helical winding to the hoop winding.

3) Case III

The solution process starts from the left polar hole 1 of the left head 2. For the initial conditions, the slip coefficient 2 is given, the initial winding angle is as follows: α=89.9° (the tangent value of 90° cannot be calculated), and the initial center angle of rotation is as follows: θ=0°. By substituting the initial conditions into Formula 1, the change value of the winding angle at the left head 2 with the axial coordinate can be obtained. In order to ensure the complete transition of the whole calculation, the last point of the left head 2 is taken as the first point of the cylinder body 4, and the first point of the cylinder body 4 is at the left equator 3. Therefore, α and θ corresponding to the left equator 3 are substituted into Formula 1 to continue solving to obtain the winding angle of the cylinder body section at the iteration termination point. A first determination is made on the winding angle of the cylinder body section: if the winding angle of the cylinder body section is less than 85°, it is considered that the helical winding cannot be transitioned to the hoop winding when the cylinder body 4 is reached for the first time. At this time, the winding angle of the right head is calculated. The last point of the cylinder body 4 is taken as the first point of the right head 6, and the last point of the cylinder body 4 is at the right equator 5. Therefore, α and θ corresponding to the right equator 5 are substituted into Formula 1 to continue to solve the winding angle of the right head section until the winding angle of the right head section reaches 89.9°, the position at this time is taken as the return point, and the return point is taken as the iteration starting point. The initial conditions set above are re-substituted into Formula 1 for solution to calculate the winding angle of the cylinder body section at the iteration termination point returned from the right head 6. At this time, a second determination is made on the winding angle of the cylinder body section. If the winding angle of the cylinder body section is less than 85°, it means that the helical winding cannot be transitioned to the hoop winding when the cylinder body 4 is reached for the second time. At this time, the winding angle of the left head is calculated again. The last point of the cylinder body 4 is taken as the first point of the left head 2, and the last point of the cylinder body 4 is at the left equator 3. Therefore, α and θ corresponding to the left equator 3 are substituted into Formula 1 to continue to solve the winding angle of the left head section until the winding angle of the left head section reaches 89.9°, the position at this time is taken as the return point, and the return point is taken as the iteration starting point. The initial conditions set above are re-substituted into Formula 1 for solution to calculate the winding angle of the cylinder body section at the iteration termination point returned from the left head 2. At this time, a third determination is made on the winding angle of the cylinder body section. If the winding angle of the cylinder body section is greater than 85°, the helical winding can be transitioned to the hoop winding when the cylinder body 4 is reached for the third time. However, since the end point of the helical winding to the hoop winding may not be exactly located at the right equator 5 at this time, in order to make the end point of the helical winding to the hoop winding be located at the right equator 5 (because the starting point of the hoop winding is at the equator), the slip coefficient 2 needs to be adjusted to extend the length of the transition section to the right equator 5. Therefore, according to Formula 2, the actual slip coefficient of the cylinder body section is re-calculated. The actual slip coefficient of the cylinder body section is substituted into the winding angle solution formula of Formula 1 to re-solve the winding angle on the cylinder body 4, so as to ensure that the helical winding is transitioned to the hoop winding just at the right equator 5.

4) Case IV

If the above three conditions are not tenable, it means that the helical winding cannot be transitioned to the hoop winding under the given initial conditions. At this time, the program is terminated, and the helical winding cannot be converted to the hoop winding by default. It is necessary to change the initial conditions, that is, to change the initially set slip coefficient λ, and then substitute the above three conditions for re-calculation.

Figure 3:
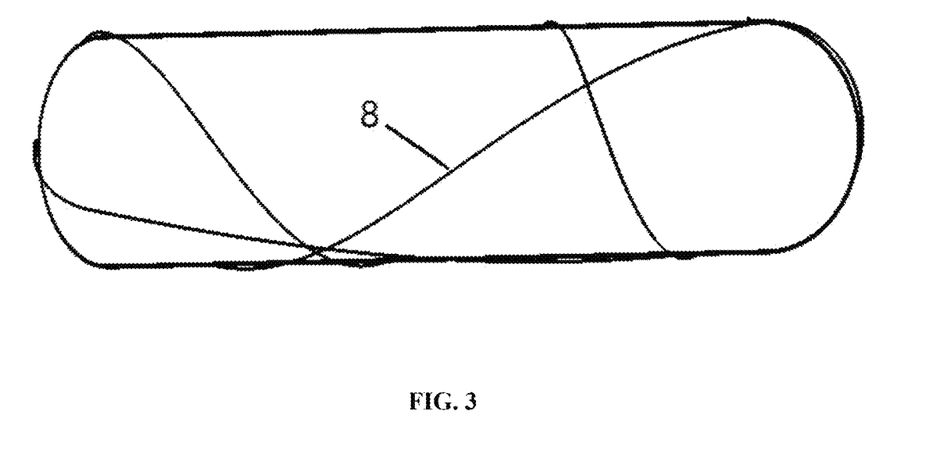
FIG. 3 is a winding diagram of a planned helical winding transition section provided by Embodiment 1 of the present disclosure.

In the above example, the initial slip coefficient between the fibers and the mandrel is given first, and the winding angle of the left head and the cylinder body is solved. Whether the winding angle of the cylinder body exceeds 85° is determined. If it exceeds 85°, the slip coefficient is calculated according to Formula 2, such that the fiber winding angle at the right equator just reaches 85°, so as to linearly transition from the helical winding to the hoop winding. If the winding angle of the cylinder body does not reach 85°, the winding angle of the right head and the winding angle of the cylinder body returning from the right head to the cylinder body are calculated continuously. Whether the winding angle of the cylinder body exceeds 85° is determined. If it exceeds 85°, the slip coefficient is calculated according to Formula 2, such that the fiber winding angle at the left equator just reaches 85°, so as to linearly transition from the helical winding to the hoop winding. If the winding angle of the cylinder body does not reach 85°, the winding angle of the left head and the winding angle of the cylinder body are calculated continuously. Whether the winding angle of the cylinder body exceeds 85° is determined. If it exceeds 85°, the slip coefficient is calculated according to Formula 2, such that the fiber winding angle at the right equator just reaches 85°, so as to linearly transition from the helical winding to the hoop winding. If the winding angle of the cylinder body does not reach 85°, the calculation stops. By default, the transition winding of the mandrel cannot be achieved under the slip coefficient, and the initial slip coefficient needs to be increased. The resulting helical winding transition section is shown in FIG. 3. Furthermore, in the present embodiment, the slip coefficient between the fibers and the mandrel is adjusted without exceeding the maximum static friction coefficient, such that when the yarn nozzle reaches the equator, the winding angle of the fibers reaches exactly 85°.

The present embodiment belongs to the technical field of composite fiber winding, and discloses a transition method from helical winding to hoop winding of composite fibers, which can automatically transition from the helical winding to the hoop winding. The general idea of this method is to move the filament nozzle from the termination point of the helical winding to the starting point of the hoop winding, and at the same time, the fiber winding angle is transformed to reach 85° at the starting point of the hoop winding. The transition winding implemented in the present embodiment can avoid multiple yarn cuttings in the traditional winding process, reduce manual participation, and improve winding efficiency, and is also conducive to the transformation of the winding process from semi-automation to full automation.

Embodiment 2

Figure 4:
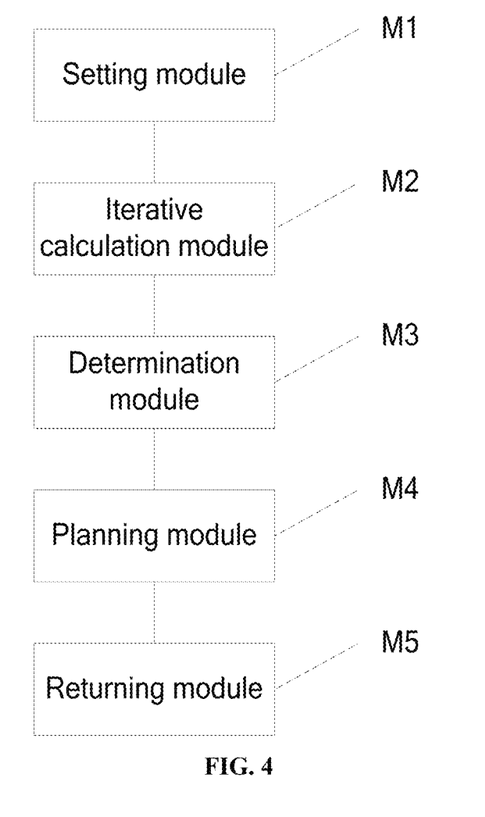
FIG. 4 is a system block diagram of a transition system provided by Embodiment 2 of the present disclosure.

The present embodiment is to provide a transition system from helical winding to hoop winding of composite fibers, as shown in FIG. 4, including: a setting module, an iterative calculation module, a determination module, a planning module, and a returning module.

The setting module M1 is configured to set a slip coefficient, and take a termination point of the helical winding as an iteration starting point of a helical winding transition section.

The iterative calculation module M2 is configured to perform iterative calculation forward from the iteration starting point according to an equation set of a winding angle and a center angle of rotation to obtain a winding angle at an iteration termination point. A direction from the iteration starting point to a cylinder body is defined as a front direction.

The determination module M3 is configured to determine whether the winding angle at the iteration termination point is greater than a first preset angle to obtain a first determination result.

The planning module M4 is configured to adjust the slip coefficient corresponding to the cylinder body according to the first preset angle, extend a length of the helical winding transition section to a front equator, and start the hoop winding at the front equator at the first preset angle to complete planning of the helical winding transition section if the first determination result is yes.

The returning module M5 is configured to determine whether a number of times of determination of the first determination result of no reaches a preset number of times if the first determination result is no, set the number of times of determination to 0 and return to the step of "setting a slip coefficient" if yes, and search for a return point on a front head, take the return point as the iteration starting point, and return to the step of "performing iterative calculation forward from the iteration starting point according to an equation set of a winding angle and a center angle of rotation" if not.

The present embodiment aims to overcome the deficiencies in the prior art, directly enables the winding machine to realize the transition through program commands, avoids machine stopping and human participation, and greatly improves the winding efficiency. Compared with the prior art, the present embodiment can automatically transition from the helical winding to the hoop winding, reduce manpower input, and improve winding efficiency. In addition, a whole winding process is continuously performed, and overall mechanical properties of a wound product can be improved.

All embodiments in this specification focus on the differences from other embodiments. The same or similar portions of these embodiments may refer to one another. Since the system disclosed in an embodiment corresponds to the method disclosed in another embodiment, the description is relatively simple, and reference can be made to the method description.

Specific examples are used herein to explain the principles and implementations of the present disclosure. The foregoing description of the embodiments is merely intended to help understand the method of the present disclosure and its core ideas; besides, various modifications may be made by those of ordinary skill in the art to specific implementations and the scope of application in accordance with the ideas of the present disclosure. In conclusion, the content of the present description shall not be construed as limitations to the present disclosure.

What is claimed is:

1. A method for winding composite fibers, comprising the following steps:
    performing helical winding of composite fibers about a mandrel, the composite fibers exhibiting a slip coefficient, the mandrel extending between a left head and a right head, a cylinder body disposed between the left head and the right head, a left equator disposed between the left head and the cylinder body, a right equator disposed between the right head and the cylinder body, a left polar hole disposed at the left head, and a right polar hole disposed at the right head;
    taking a termination point of the helical winding as an iteration starting point of a helical winding transition section, wherein the iteration starting point is located at the left polar hole or the right polar hole of the mandrel;
    performing iterative calculation forward from the iteration starting point according to an equation set of a winding angle and a center angle of rotation to obtain a winding angle at an iteration termination point, wherein a direction from the iteration starting point to the cylinder body is defined as a front direction; and
    determining whether the winding angle at the iteration termination point is greater than a first preset angle to obtain a first determination result;
    if the first determination result is yes, adjusting the slip coefficient corresponding to the cylinder body according to the first preset angle, extending a length of the helical winding transition section to a front equator, and performing hoop winding of the composite fibers about the mandrel at the front equator at the first preset angle; wherein the front equator refers to a corresponding one of the left equator or the right equator when composite fibers winding direction is taken as a forward direction;

wherein, based on the left polar hole being the iteration starting point, the right equator is the front equator, the left equator is a rear equator, and the right head is a front head; and wherein, based on the right polar hole being the iteration starting point, the left equator is the front equator, the right equator is the rear equator, and the left head is the front head; and wherein the step of adjusting the slip coefficient corresponding to the cylinder body according to the first preset angle further comprises the following steps:

taking a winding angle at the rear equator during the iterative calculation as a first winding angle, and adjusting the slip coefficient corresponding to the cylinder body by a slip coefficient calculation formula according to the first winding angle and the first preset angle;

if the first determination result is no, determining whether a number of times of determination of the first determination result of no reaches a preset number of times; if yes, setting the number of times of determination to 0, and returning to the step of "setting a slip coefficient"; and if not, searching for a return point on the front head, taking the return point as the iteration starting point, and returning to the step of "performing iterative calculation forward from the iteration starting point according to an equation set of a winding angle and a center angle of rotation".

2. The method according to claim 1, wherein the equation set of the winding angle and the center angle of rotation comprises:

$$\begin{cases} \dfrac{d\alpha}{dz} = \dfrac{\lambda\left[(1+r'^2)\sin^2\alpha - rr''\cos^2\alpha\right] - (1+r'^2)r'\sin\alpha}{r\cos\alpha(1+r'^2)} \\ \dfrac{d\theta}{dz} = \dfrac{r\tan\alpha}{\sqrt{1+(r')^2}} \end{cases},$$

wherein $\alpha$ is the winding angle; z is an axial coordinate of the mandrel; $\lambda$ is the slip coefficient between the composite fibers and the mandrel; r is a radius of the mandrel corresponding to the axial coordinate; r' is a first derivative of the radius of the mandrel to the axial coordinate; r" is a second derivative of the radius of the mandrel to the axial coordinate; and $\theta$ is the center angle of rotation.

3. The method according to claim 1, wherein the step of performing iterative calculation forward from the iteration starting point according to the equation set of the winding angle and the center angle of rotation to obtain the winding angle at the iteration termination point specifically comprises the following steps:

setting the winding angle and the center angle of rotation at the iteration starting point, and taking the winding angle and the center angle of rotation at the iteration starting point as a previous winding angle and a previous center angle of rotation;

calculating a current axial coordinate according to a preset stride in each iteration;

taking the current axial coordinate, the previous winding angle, and the previous center angle of rotation as inputs, and calculating a current winding angle and a current center angle of rotation according to the equation set of the winding angle and the center angle of rotation; and determining whether iteration termination conditions are reached;

if yes, ending the iteration to obtain the winding angle at the iteration termination point; and if not, continuing the iteration, taking the current winding angle as the previous winding angle in a next iteration, taking the current center angle of rotation as the previous center angle of rotation in the next iteration, and returning to the step of "calculating a current axial coordinate according to a preset stride in each iteration".

4. The method according to claim 3, wherein the step of determining whether iteration termination conditions are reached, if yes, ending the iteration to obtain the winding angle at the iteration termination point, and if not, continuing the iteration specifically comprises the following steps:

determining whether the current axial coordinate is less than an axial coordinate at the front equator to obtain a second determination result, wherein the axial coordinate is a coordinate obtained by taking the iteration starting point as a coordinate origin and the front direction as a positive axial direction;

if the second determination result is no, ending the iteration, and taking a position of an axial coordinate of a previous iteration as the iteration termination point and a winding angle of the previous iteration as the winding angle at the iteration termination point; and if the second determination result is yes, determining whether the current winding angle reaches a second preset angle to obtain a third determination result;

if the third determination result is yes, ending the iteration, and taking a position of the current axial coordinate as the iteration termination point and the current winding angle as the winding angle at the iteration termination point; and if the third determination result is no, continuing the iteration.

5. The method according to claim 1, wherein the slip coefficient calculation formula comprises:

$$L = \frac{R}{\lambda_1}\left(\frac{1}{\sin\alpha_0} - \frac{1}{\sin\alpha_1}\right),$$

wherein L is a length of the cylinder body; R is a radius of the cylinder body; $\lambda_1$ is the slip coefficient corresponding to the cylinder body; $\alpha_0$ is the first winding angle; and $\alpha_1$ is the first preset angle.

6. The method according to claim 1, wherein the step of searching for the return point on the front head specifically comprises the following steps:

taking the front equator as the iteration starting point, performing the iterative calculation forward from the iteration starting point according to the equation set of the winding angle and the center angle of rotation, and determining the iterative termination point; and taking the termination point as the return point on the front head.

7. The method according to claim 6, wherein the step of performing iterative calculation forward from the iteration starting point according to the equation set of the winding angle and the center angle of rotation, and determining the iteration termination point specifically comprises the following steps:

taking the winding angle and the center angle of rotation at the starting point as an initial winding angle and an initial center angle of rotation;

calculating an axial coordinate after the iteration according to a preset stride in each iteration;

taking the axial coordinate after the iteration, the initial winding angle, and the initial center angle of rotation as inputs, and calculating a winding angle after the iteration and a center angle of rotation after the iteration according to the equation set of the winding angle and the center angle of rotation; and determining whether the winding angle after the iteration reaches a third preset angle;

if yes, ending the iteration, and taking a position of the axial coordinate after the iteration as the iteration termination point; and if not, continuing the iteration, taking the winding angle after the iteration as an initial winding angle in a next iteration, taking the center angle of rotation after the iteration as an initial center angle of rotation in the next iteration, and returning to the step of "calculating an axial coordinate after the iteration according to a preset stride in each iteration".

8. The method according to claim 1, wherein the preset number of times is 3.

9. A system for winding composite fibers, comprising:

a transition system configured to communicatively couple to a winding machine having a mandrel about which composite fibers are wound and to control a transition from helical winding to hoop winding of the composite fibers, the mandrel extending between a left head and a right head, a cylinder body disposed between the left head and the right head, a left equator disposed between the left head and the cylinder body, a right equator disposed between the right head and the cylinder body, a left polar hole disposed at the left head, and a right polar hole disposed at the right head;

the transition system having:

a setting module configured to set a slip coefficient based on winding angle, and take a termination point of the helical winding as an iteration starting point of a helical winding transition section, wherein the iteration starting point is located at the left polar hole or the right polar hole of the mandrel;

an iterative calculation module configured to perform iterative calculation forward from the iteration starting point according to an equation set of a winding angle and a center angle of rotation to obtain a winding angle at an iteration termination point, wherein a direction from the iteration starting point to the cylinder body is defined as a front direction; and a determination module configured to determine whether the winding angle at the iteration termination point is greater than a first preset angle to obtain a first determination result;

a planning module configured to adjust the slip coefficient corresponding to the cylinder body according to the first preset angle, extend a length of the helical winding transition section to a front equator, and perform the hoop winding about the mandrel at the front equator at the first preset angle if the first determination result is yes; wherein the front equator refers to a corresponding one of the left equator or the right equator when composite fibers winding direction is taken as a forward direction; wherein, based on the left polar hole being the iteration starting point, the right equator is the front equator, the left equator is a rear equator, and the right head is a front head; and wherein, based on the right polar hole being the iteration starting point, the left equator is the front equator, the right equator is the rear equator, and the left head is the front head; and a returning module configured to determine whether a number of times of determination of the first determination result of no reaches a preset number of times if the first determination result is no, set the number of times of determination to 0 and return to the step of "setting a slip coefficient" if yes, and search for a return point on the front head, take the return point as the iteration starting point, and return to the step of "performing iterative calculation forward from the iteration starting point according to an equation set of a winding angle and a center angle of rotation" if not.

* * * * *